(12) United States Patent
Moon

(10) Patent No.: US 6,455,128 B1
(45) Date of Patent: Sep. 24, 2002

(54) DISPLAY SYSTEM FOR AN ARTICLE OF CLOTHING

(76) Inventor: Dennis Moon, 3700 Easton Dr., Suite 3, Bakersfield, CA (US) 93309

( * ) Notice: Subject to any disclaimer, the term of this patent is extended or adjusted under 35 U.S.C. 154(b) by 74 days.

(21) Appl. No.: 09/648,324

(22) Filed: Aug. 25, 2000

(51) Int. Cl.[7] ................................................. B32B 3/10
(52) U.S. Cl. ...................... 428/138; 428/13; 428/203; 36/136
(58) Field of Search ............................ 36/136; 40/636; 2/245; 428/13, 203, 138

(56) References Cited

U.S. PATENT DOCUMENTS 1,583,274 A * 5/1926 Bostock ........................... 2/245
4,837,960 A * 6/1989 Skaja ............................ 40/636
5,987,790 A * 11/1999 Sullivan ........................ 428/13

* cited by examiner

*Primary Examiner*—Alexander S. Thomas
(74) *Attorney, Agent, or Firm*—Timothy Thut Tyson; Ted Masters; Freilich, Hornbaker & Rosen

(57) ABSTRACT

A display system for an article of clothing (20) includes an article of clothing (22) having an outer layer (28) which has an aperture (30). A display receiving insert (24) has a plate (32) which is shaped and dimensioned to fit into the aperture (30). The display receiving insert (24) is permanently attached to the article of clothing (22) so that plate (32) fits into aperture (30) and faces outward. A display (26) is then adhesively attached to plate (32).

2 Claims, 4 Drawing Sheets

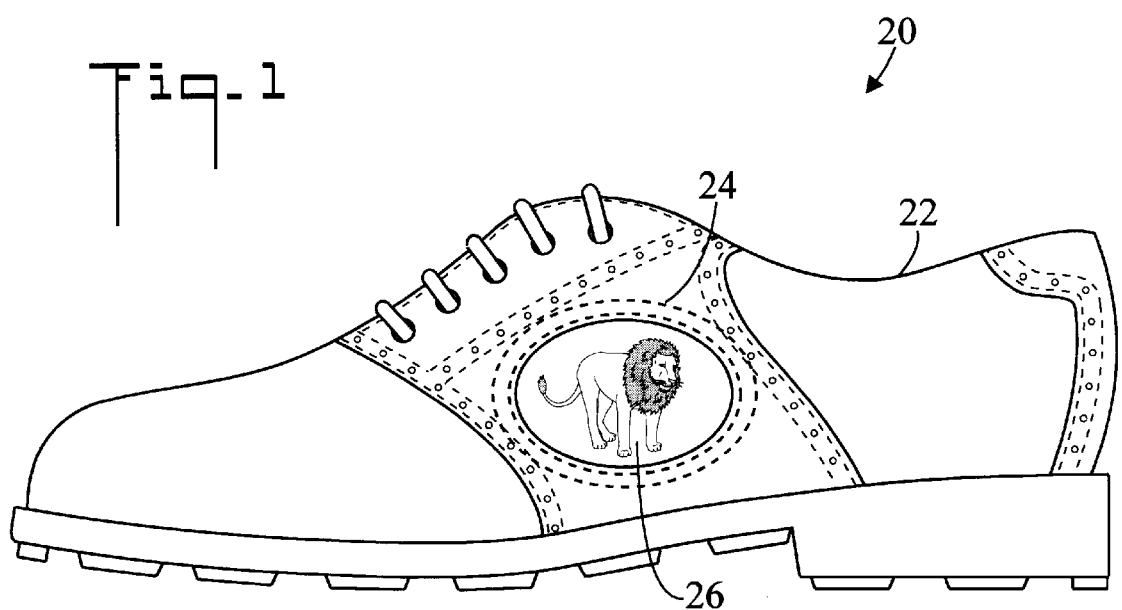
Fig_1

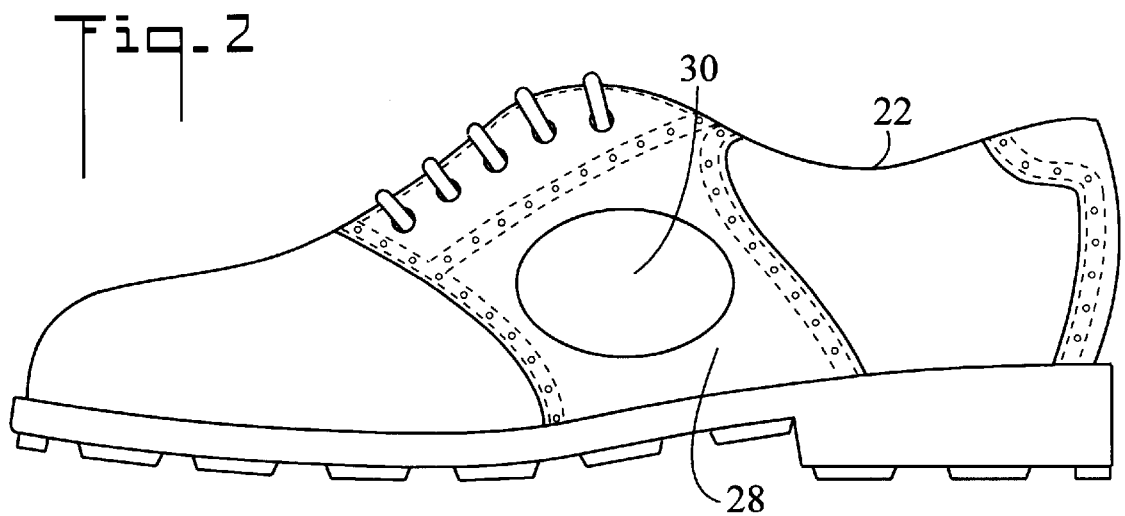
Fig_2
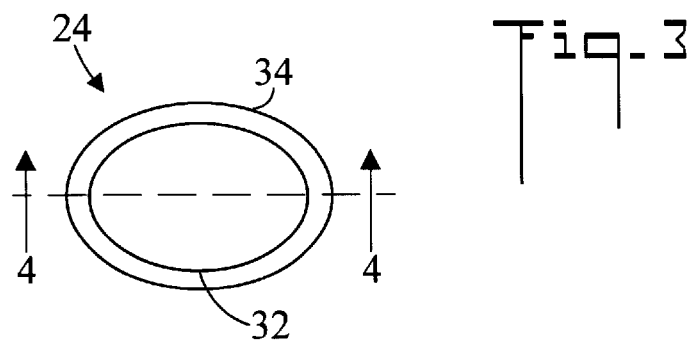
Fig_3

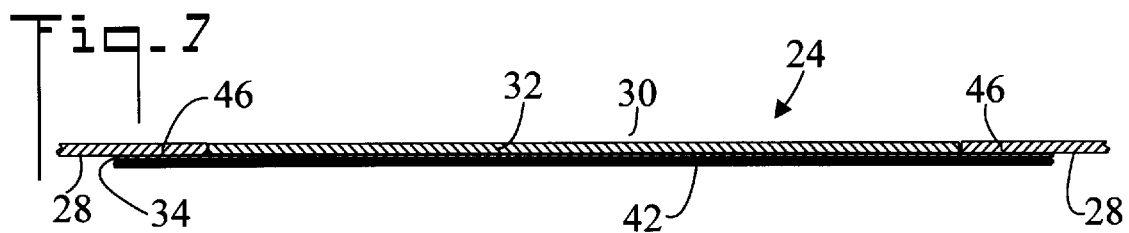
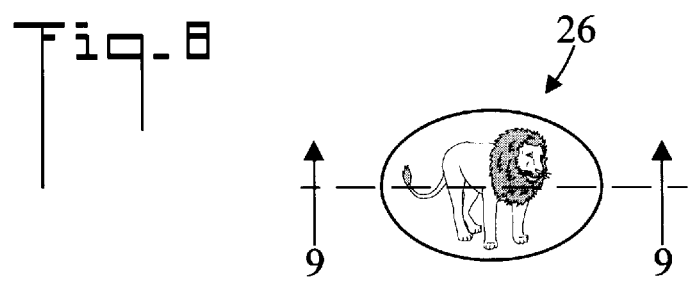
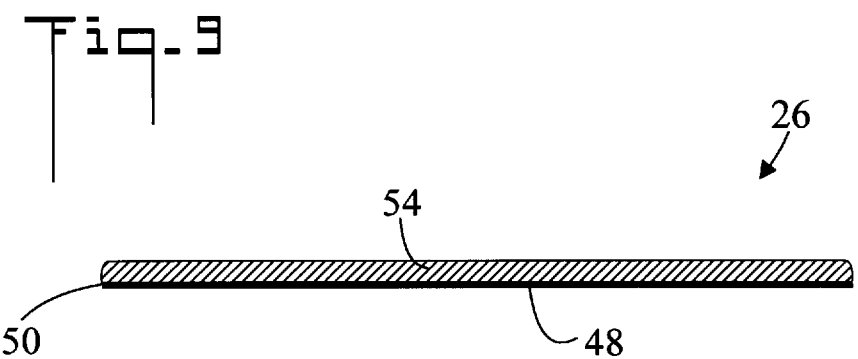
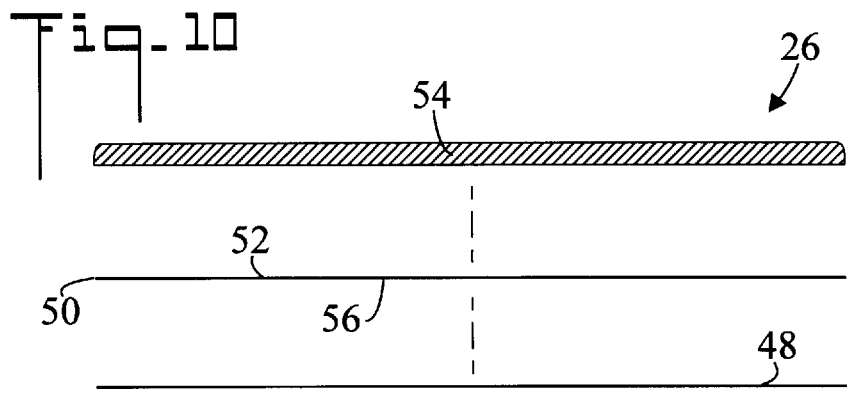

DISPLAY SYSTEM FOR AN ARTICLE OF CLOTHING

TECHNICAL FIELD

The present invention pertains generally to articles of clothing and in particular to a display system for attaching a logo or emblem to the article.

BACKGROUND ART

Articles of clothing including footwear having customized displays such as logos, emblems, and the like, are well known in the art. Such articles range from baseball-type caps and polo shirts, to gloves and athletic shoes. The display may be simply printed on the article, or may comprise artistic stitching which is sewn onto the article. Alternatively, the display may be separate from the article, and either replaceably or permanently attached. For example, U.S. Pat. No. 4,852,276 shows a shoe having a replaceable logo. An outer material is secured to a part of the shoe so as to form a frame or opening positioned at the side of the shoe. An insert, such as a design or logo, is reversibly secured within the frame by a pressure sensitive adhesive. The insert is further held in place by a flexible lip formed by the outer material which overlaps the edges of the insert material. U.S. Pat. No. 5,359,790 illustrates a shoe having individualized display areas. The shoe has an upper portion which includes an individualized indicia display area in any one of the side quarter panels, tongue, or heel portion of the upper portion of the shoe. The shoe includes an outer covering material in which a window or opening is formed to make visible and accessible an indicia attachment panel underlying the outer covering material. An indicia display panel is formed from a plurality of individual indicia or is a unitary panel to which indicia, such as letters, numbers, or emblems are applied. The purchaser has the ability to individualize the shoe in virtually unlimited manner to include a personalized message or slogan that no other purchaser may have. The indicia display panel is attached to the attachment panel either by heat sealing adhesive, or by pressure sensitive adhesive. U.S. Pat. No. 5,367,795 defines a shoe having individualized display areas similar to U.S. Pat. No. 5,359,790, the difference being that the indicia display panel is preferably attached by stitching. U.S. Pat. No. 5,800,900 discloses decorative attachments for articles of clothing and footwear. An insertable patch or emblem fits under the overlapping layer of a pocket formed in the article of clothing or footwear. The patch or emblem and the pocket in the article include releasable attachment means.

There exists a market for articles of clothing such as golf shoes having customized logos either to promote a particular company or a particular sporting event. In the past when a customer wanted golf shoes having customized logos, the order would have to be placed far in advance and guesses made as to the sizes of shoes that will be required. The result was many pairs of customized shoes which were not usable because they were the wrong size, the sporting event was canceled, or too many pairs of shoes were ordered.

The present invention offers a simple and practical solution to this problem.

DISCLOSURE OF INVENTION

The present invention is directed to a display system for an article of clothing. While the specific example disclosed herein pertains to shoes, it may be readily appreciated that the principles of the present invention could readily be applied to any other article of clothing such as hats, shirts, coats, pants, belts, gloves, socks and the like. In the present invention, an article of clothing such as a pair of golf shoes includes an aperture into which a display receiving insert is mounted. The display receiving insert has a smooth plate designed to adhesively accept a separate display such as a logo. In this manner the article of clothing can be manufactured without the customized display, and the customized display can be conveniently added at the point of purchase after the customer has selected the proper shoe size. Therefore, no shoes are wasted by having to be customized in advanced.

In accordance with a preferred embodiment of the invention, a display system for an article of clothing includes an article of clothing which has an outer layer in which an aperture is placed. A display receiving insert having a plate shaped and dimensioned to fit into the aperture is permanently connected to the outer layer of the article of clothing, so that the plate fits into the aperture from the back of the outer layer and faces outward.

In accordance with an important aspect of the invention, the display receiving insert includes a sheet having a first side and an opposite second side. The plate is substantially centrally mounted on the larger sheet using an adhesive, so that the sheet forms a border around the plate. A backing is connected to the second side of the sheet.

In accordance with an important feature of the invention, a display such as an emblem or logo is attachable to the plate using an adhesive disposed on the back of the display.

In accordance with another important aspect of the invention, the display includes a lamina having a logo or emblem disposed on a front side. The indicia is covered by a clear scuff resistant epoxy dome.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a side elevation view of a display system for an article of clothing in accordance with the present invention;

FIG. 2 is a side elevation view of an article of clothing, specifically a shoe;

FIG. 3 is a top plan view of a display receiving insert;

FIG. 7 is an enlarged cross-sectional view along the line 7—7 of FIG. 6;

FIG. 8 is a top plan view of a display,

FIG. 9 is an enlarged cross-sectional view of the display along the line 9—9 of FIG. 8; and, FIG. 10 is an exploded view of FIG. 9.

MODES FOR CARRYING OUT THE INVENTION

Figure 4:
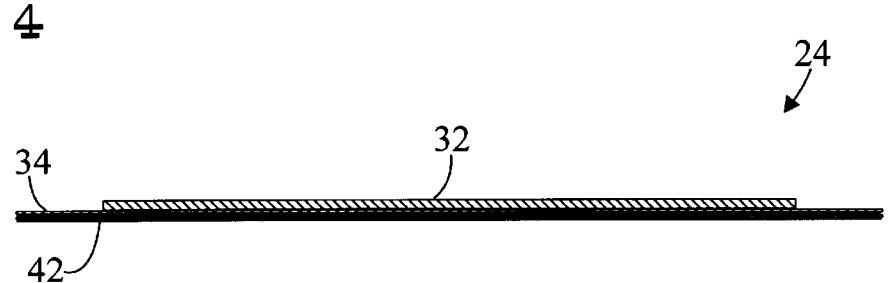
FIG. 4 is an enlarged cross-sectional view of the display receiving insert along the line 4—4 of FIG .3
Figure 5:
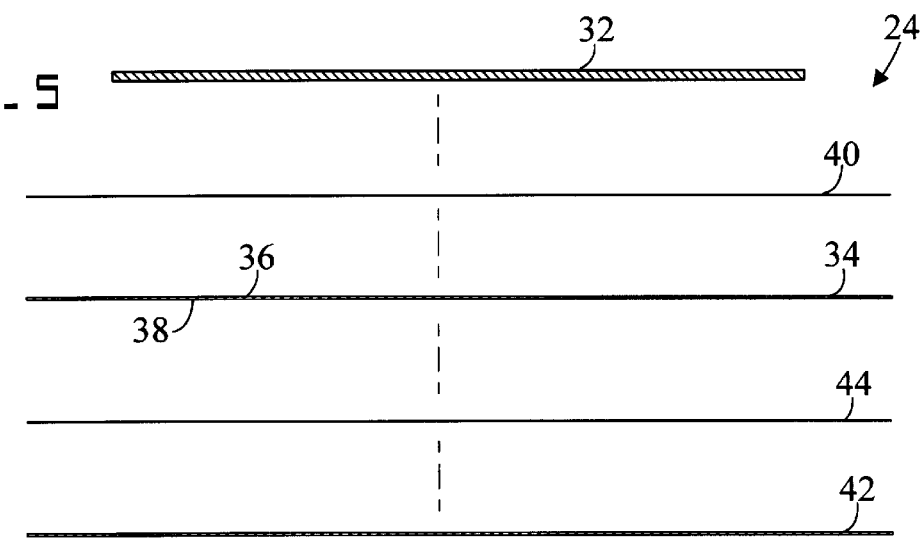
FIG. 5 is an exploded view of FIG. 4.

Referring initially to FIG. 1, there is illustrated a side elevation view of a display system for an article of clothing in accordance with the present invention, generally designated as 20. Display system 20 includes an article of clothing 22 to which a display receiving insert 24 is permanently attached. A display 26 containing an emblem or logo is then attached by an adhesive to display receiving insert 24. As defined herein, article of clothing 22 can embrace any form of apparel worn by a person such as a hat, a shirt, a coat, pants, a glove, a belt, footwear, socks, and the like.

Referring now to FIGS. 2–7 there are illustrated, respectively, a side elevation view of article of clothing 22, specifically a shoe, a top plan view of display receiving insert 24, an enlarged cross-sectional view of the display receiving insert 24, an exploded view of display receiving insert 24, a side elevation view of article of clothing 22 with display receiving insert 24 installed, and an enlarged cross-sectional view of the installed display receiving insert 24. Display system 20 includes an article of clothing 22 having an outer layer 28 having an aperture 30. Display receiving insert 24 has a smooth plate 32 shaped and dimensioned to fit into aperture 30. In a preferred embodiment, plate 32 is fabricated from a flexible polymer and is approximately 0.020 inches thick. The thickness is selected to be slightly less than the thickness of outer layer 28 so that when display 26 is installed on plate 32, display 26 will reside slightly below the surface 28 of article of clothing 22, and therefore be less inclined to peal off. Display receiving insert 24 is permanently connected to article of clothing 22 wherein plate 32 is fitted into aperture 30 from the back of outer layer 28 (refer to FIG. 7).

Figure 6:
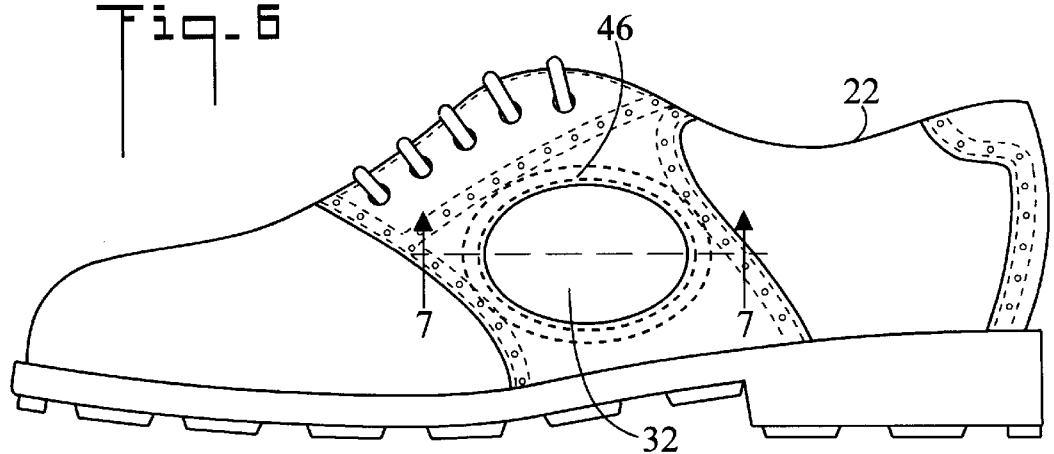
FIG. 6 is a side elevation view of the article of clothing with the display receiving insert installed.

Display receiving insert 24 includes a sheet 34, preferably fabricated from a polymer such as vinyl, having a first side 36 and an opposite second side 38. Sheet 34 is larger than plate 32, and sheet 34 is connected to plate 32 with a first adhesive 40, so that sheet 34 forms a border (for stitching) around plate 32. A backing 42 is connected to second side 38 of sheet 34. Backing 42 prevents sheet 34 from stretching, and also provides a suitable material for stitching display receiving insert 24 to article of clothing 22. In a preferred embodiment, backing 42 is nylon tape having a second adhesive 44 which connects backing 42 to sheet 34. In FIGS. 6 and 7, display receiving insert 24 has been installed in article of clothing 22 with stitching 46, so that plate 32 substantially occupies aperture 30 in article of clothing 22.

Now referring to FIGS. 8, 9, and 10, there are illustrated, respectively, a top plan view of display 26, an enlarged cross-sectional view of display 26, and an enlarged exploded view of display 26. Display 26 is attachable to plate 32 with a third adhesive 48 which is disposed on one side 56 of display 26. Display 26 is then simply pressed onto plate 32. Third adhesive 48 is preferably selected to provide a permanent bond, and thereby permanently hold display 26 in place. However, third adhesive 48 could also be selected to allow display 26 to be selectively attached and removed from plate 32.

Display 26 includes a lamina 50 having indicia 52 (such as a logo or emblem) disposed on a first side 52. For protection, indicia 52 is covered by a clear scuff resistant epoxy dome 54. Lamina 50 has an opposite second side 56 having third adhesive 48 disposed thereon. In a preferred embodiment lamina 50 is fabricated from a polymer such as vinyl. The construction of display 26 is such that display 26 is both flexible and waterproof.

In a preferred embodiment, the following materials are used in the present invention:

first adhesive 40, is WELD-ON 66 available from IPS Corp. of Compton, Calif.;

second adhesive 44 is an integral part of the self adhesive nylon reinforcement tape;

third adhesive 48 is 3M Scotchcal Film Series 220 available from 3M, of St. Paul, Minn.;

plate 32 is ridged vinyl;

sheet 34 is flexible vinyl; and, epoxy dome 54 is DC-2550 flexible epoxy doming resin, available from Epoxies Etc., Deco-Coat Product Line, of Cranston, R.I.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A display system for an article of clothing, comprising:

said article of clothing having an outer layer having an aperture;

a display receiving insert having a plate shaped and dimensioned to fit into said aperture;

said display receiving insert permanently connected to said article of clothing wherein said plate is fitted into said aperture;

a display attachable to said plate with an adhesive;

said display including a lamina having indicia disposed on a first side;

said indicia covered by clear epoxy; and, said lamina having an opposite second side having said adhesive disposed thereon.

2. A display system for an article of clothing, comprising:

said article of clothing having an outer layer having an aperture;

a display receiving insert having a plate shaped and dimensioned to fit into said aperture;

said display receiving insert permanently connected to said article of clothing wherein said plate is fitted into said aperture;

said plate fabricated from a polymer;

said display receiving insert including a sheet having a first side and an opposite second side;

said sheet larger than said plate;

said sheet connected to said plate by a first adhesive and forming a border thereabout;

backing connected to said second side of said sheet by a second adhesive;

a display attachable to said plate;

said display including a lamina having indicia disposed on a first side, and a third adhesive disposed on a second side;

said indicia covered by clear epoxy; and, said display being both flexible and waterproof.

* * * * *